United States Patent [19]
Böhm et al.

[11] Patent Number: 4,579,008
[45] Date of Patent: Apr. 1, 1986

[54] ELECTROMAGNETIC PULSE PICK-UP ARRANGEMENT IN A FLOW METER

[75] Inventors: Jürgen Böhm, Mannheim-Wallstadt; Walter Jerger, Mannheim, both of Fed. Rep. of Germany

[73] Assignee: Bopp & Reuther GmbH, Mannheim, Fed. Rep. of Germany

[21] Appl. No.: 623,135

[22] Filed: Jun. 18, 1984

[30] Foreign Application Priority Data

Jun. 18, 1983 [DE] Fed. Rep. of Germany ....... 3321952

[51] Int. Cl.$^4$ .................. G01P 3/10; G01D 3/487
[52] U.S. Cl. .................................... 73/861.78; 73/261
[58] Field of Search ................ 73/861.77, 861.78, 253, 73/261; 324/174

[56] References Cited

U.S. PATENT DOCUMENTS 4,265,127 5/1981 Onoda .............................. 73/861.78
4,364,011 12/1982 Bloomfield et al. ................ 324/174

FOREIGN PATENT DOCUMENTS 3046804 9/1980 Fed. Rep. of Germany .

OTHER PUBLICATIONS

German magazine "Electronik", 1980, copy 7, p. 45.

Primary Examiner—Herbert Goldstein
Attorney, Agent, or Firm—Michael J. Striker

[57] ABSTRACT

An electromagnetic pulse pick-up unit, particularly for use in flow meters having small nominal width, comprises a pair of magnets arranged at opposite locations and with opposite polarity in a measuring gear of the flow meter. Concentrically arranged with the axis of rotation of the gear, there is provided a sensing unit assembled of a central pick-up cylinder, a sensing coil arranged around the portion of the cylinder facing the magnet, and a plurality of Wiegand wires distributed side by side in axial direction on the cylindrical outer surface of the pick-up cylinder in close proximity to the sensing coil. A pole ring of magnetically conductive material short circuits the ends of the Wiegand wires remote from the magnets.

9 Claims, 4 Drawing Figures

ELECTROMAGNETIC PULSE PICK-UP ARRANGEMENT IN A FLOW METER

BACKGROUND OF THE INVENTION

The present invention relates in general to flow meters and in particular to an electromagnetic pick-up arrangement in flow meters particularly in flow meters of small nominal width. The flow meter is of the type which includes a measuring chamber, a measuring wheel supported for rotation in the chamber and including a magnetic device having pole surfaces directed against an end wall of the measuring chamber. The end wall is of a magnetically non-conductive material and is formed with a well or space in which a Wiegand sensor is fixedly arranged in such a manner that during each rotation of the measuring wheel electric pulses are generated in the sensor whereby the number of pulses is a measure of flow of a medium streaming through the measuring chamber.

A pulse pick-up of this kind is described for example in the German publication DE-OS No. 3,046,804 which discloses a Wiegand sensor for impeller type counters in flow meters with mechanism and indicator operating in air. In this prior art arrangement, a ring magnet is embodied in the hub of the impeller to rotate therewith and to act on a single Wiegand wire which is surrounded by a sensing coil and oriented transversely to the axis of rotation of the impeller and closing the latter midway of its length. The Weigand wire is arranged outside a separating wall. The disadvantage of this known arrangement is the limited number of generated pulses inasmuch during each rotation of the impeller only a single pulse is generated and consequently resolution of the measured value low. Moreover this relatively large ring magnet cannot be installed in flow meters of very small nominal width because in such flow meters the measuring gears may be of smaller size than the required dimensions of the ring magnet. In this case, the ring magnet must be driven as a separate rotating member by the measuring wheel and consequently the rotating mass would be substantially increased.

In the German magazine "Electronic", 1980, copy 7, page 45, the application of Wiegand wires as a sensing module in flow meters has been devised. In this article an arrangement is described in which a number of Wiegand wires is arranged axis parallel on the jacket of a sensing drum rotating together with the measuring wheel. The sensing coil of the module together with magnets are disposed in a separate structural unit which must be mounted on the outer surface of a stationary housing part of the flow meter and arranged on the sensing drum. The disadvantage of this solution is the fact that the sensing drum which is necessary for supporting and embodying the Wiegand wires rotates partially in the work space of the counter and requires additional installation space. Furthermore, the sensing drum introduces a relatively large additional rotating mass exerting breaking action on the measuring wheel. Moreover, in this known solution the sudden polarity change in the Wiegand wires must be transmitted over a relatively large distance through the housing jacket of the flow meter to the outer fixedly mounted sensing coil and consequently only relatively weak pulses are produced. Since the flow meter counters are usually made of metal an additional damping of transmitted pulses occurs. The prior art pulse pick-up arrangement is unsuitable for installation in flow meters of small nominal diameters inasmuch the sensing drum carrying the Wiegand wires is too large in relation to the diameter of the measuring wheel and therefore it would make a compact construction of the flow meter impossible.

SUMMARY OF THE INVENTION

It is therefore a general object of the present invention to overcome the aforementioned disadvantages.

More particularly, it is an object of the invention to provide an improved arrangement of Wiegand sensor suitable particularly as a pulse pick-up for flow meters of small nominal width.

Another object of this invention is to provide such an improved pulse pick-up arrangement which can be installed with minimum design changes in time-tested flow meters of compact structure without negatively affecting their measuring quality.

An additional object of this invention is to provide such an improved pulse pick-up arrangement which guarantees a high measuring resolution and a generation of strong measuring pulses.

In keeping with these objects and others which will become hereinafter, one feature of the invention resides, in a pulse pick-up arrangement in flow meters of the before described kind, in a combination which comprises a pair of opposite polarized bar magnets secured to the measuring wheel of the flow meter at diametrically opposite locations near the circumference of the wheel, a stationary Wiegand sensor arranged in the well in the non-magnetic front wall opposite the measuring wheel and being axially spaced apart from the latter, the Wiegand sensor including a concentric arrangement of a central pick-up cylinder, a sensing coil surrounding a portion of the pick-up cylinder facing the two magnets and a plurality of Wiegand wires arranged substantially axial parallel along the cylindrical outer surface of the pick-up cylinder and of the sensing coil, and a pole ring of a magnetically conductive material surrounding a portion of the pick-up remote from the two magnets and engaging the end portions of the Wiegand wires.

Due to the fact that the two opposite polarized bar magnets in the measuring wheel are spaced apart for a relatively large distance, and since these magnets are aligned with the Wiegand wires arranged on the outer jacket of the stationary pick-up cylinder and sensing coil, the pick-up cylinder and the sensing coil can be designed with a relatively large diameter and consequently an increased number of Wiegand wires can be distributed on the outer jacket of the pick-up cylinder. As a consequence, a large number of pulses is generated during each rotation of the measuring wheel resulting in a substantially increased measuring resolution. Since the Wiegand wires extend parallel to the axis of rotation of the measuring wheel and engage the pole ring at the side remote from the measuring wheel, a major part of field lines of the magnet field generated by the two opposite polarized magnetic surfaces, extend from the magnetic surface of one magnet through the magnetically non-conductive end wall of the measuring chamber and along a path constituted by the axial parallel Wiegand wires situated in the effective range of the one bar magnet, then via the magnetic pole ring and back through the Wiegand wires and end wall in the effective range of the other bar magnet.

By virtue of this axial extension of the magnetic field through the pole ring, the Wiegand wires are exposed to magnetic fields over a substantially increased length in comparison with prior art arrangements which do not employ the pole ring and where the field line would extend along the path of the least magnetic resistance through the magnetically non-conductive space between the two magnets. Due to the magnetic excitation of a substantially larger section of each Wiegand wire, a higher magnetic pulse is produced in the Wiegand wires and induces in the sensing coil which is concentrically arranged in close proximity to the parallel Wiegand wires, a high signal voltage.

In a preferred embodiment, the cylindrical surface of the pick-up cylinder is formed with an annular groove for accommodating the sensing coil and with axially directed longitudinal grooves for accommodating the Wiegand wires in the close proximity to the sensing coil. In this manner, the cylindrical jacket of the pick-up cylinder is utilized for supporting a maximum number of Wiegand wires while the diameter of the pick-up cylinder can be relatively small and at the same time, the sensing coil is in immediate effective range of the Wiegand wires.

The Wiegand wires are held in position in the longitudinal axially directed grooves either by clamping or gluing or by embedding in a plastic material together with the sensing coil.

In a particularly advantageous embodiment of this invention the pick-up cylinder is also formed with an axial blind bore 12' in which during installation of the pick-up assembly a holding magnet is temporarily inserted whereupon the Wiegand wires are loosely layed in the longitudinal grooves and are held in position by the holding magnet. Thereafter the Wiegand wires are either glued to the grooves or embedded together with a sensing coil in a cast plastic material and the holding magnet is removed.

Preferably the longitudinal axial parallel grooves on the outer surface of the cylindrical pick-up member extend up to the end face of the latter so that the ends of the Wiegand wires can be shifted into engagement with the thin walled bottom of the well in the non-magnetic end wall. In this manner, the Wiegand wires are arranged as close as possible to the bar magnets in the measuring wheel and consequently a sufficient magnetic induction is produced in the Wiegand wires even if the bar magnets are of small size. Especially in the case of counters having reduced width there is frequently no room for installing larger magnets in the measuring wheel and only by this arrangement it can be achieved a reliable sensing even in minute measuring wheels.

Preferably, the annular groove for accommodating the sensing coil is located as close as possible to the end of the pick-up cylinder facing the measuring wheel so that only a thin rim portion separates the groove from the end face of the pick-up cylinder. At the same time, the pole ring at the opposite end of the pick-up cylinder is in contact with end portions of the Wiegand wires which overlap the sensing coil. In this way a particularly strong magnetic flux is concentrated in the longitudinal direction of the Wiegand wires which in turn enables the generation of very strong pulses. At the same time, the pole ring serves as a holder for the Wiegand wires laying in the axial grooves and can be also employed as an installation aid. The pick-up cylinder together with Wiegand wires, the sensing coil and the pole ring thus forms a compact structural unit which can be easily inserted in the cylindrical well or recess in the end wall of the measuring chamber.

The two bar magnets are preferably accommodated in two blind bores formed in the side of the measuring wheel remote from the end wall of the measuring chamber and having its bottom in close proximity to the end wall. The blind bores are sealed by a stopper or plug. This sealing of the two magnets in the measuring wheel guarantees that the flow meter employing the pick-up arrangement of this invention is not subject to any limitations as regards to the applicable media and consequently the arrangement of this invention can be used also in flow meters for strongly aggressive media.

The measuring wheel can be an oval gear which during its rotation drive the two magnets at a non-uniform speed. In order to produce uniformly spaced measuring pulses during each rotation, that is a pulse sequence of constant frequency, the Wiegand wires are distributed on the jacket of the pick-up cylinder at non-uniform spacings from each other so as to compensate for the non-uniformity of the rotation. This arrangement is of particular importance in flow meters in which the output pulses are employed for regulating purposes requiring a constant frequency.

The novel features which are considered as characteristic for the invention are set forth in particular in the appended claims. The invention itself however both as to its construction and its method of operation together with additional objects and advantages thereof will be best understood from the following description of specific embodiments when read in connection with the accompanying drawing.

DESCRIPTION OF THE PREFERRED EMBODIMENTS

Figure 1:
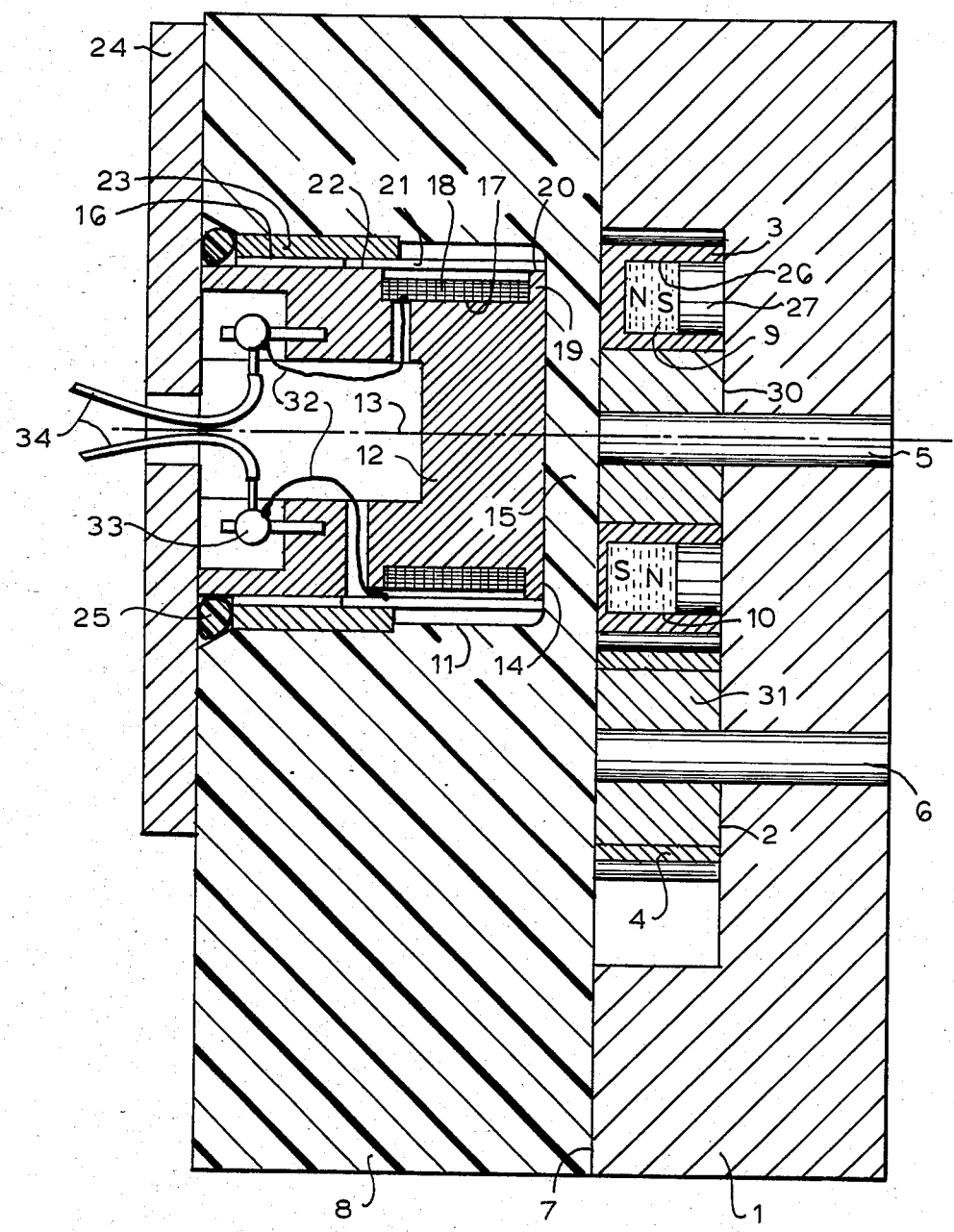
FIG. 1 is a longitudinal section of a flow meter, shown on an enlarged scale, having oval measuring gears of small nominal width and embodying the pulse pick-up arrangement of this invention.
Figure 2:
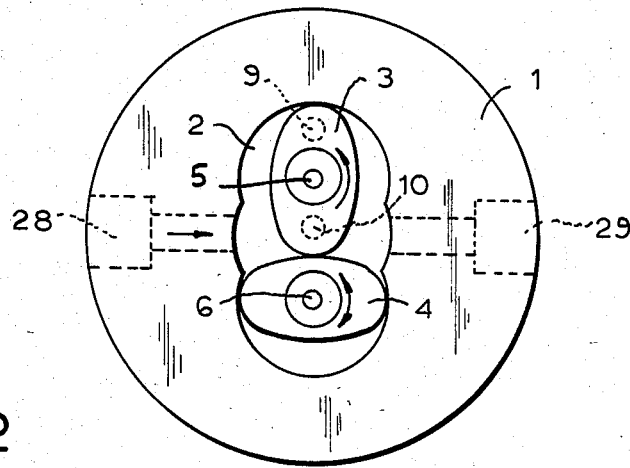
FIG. 2 is a schematic front view of oval measuring gears arranged in the measuring chamber of the flow meter.
Figure 3:
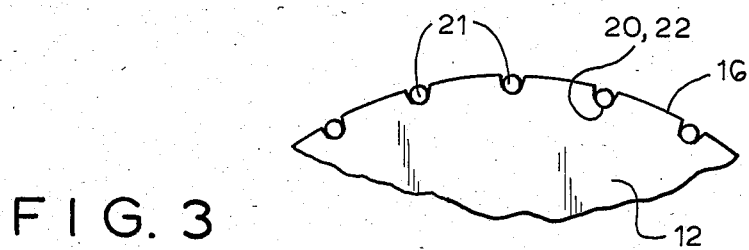
FIG. 3 is a front view of a cut-away part of the pick-up cylinder in the arrangement of this invention, shown with axial parallel grooves on its jacket with inserted Wiegand wires.
Figure 4:
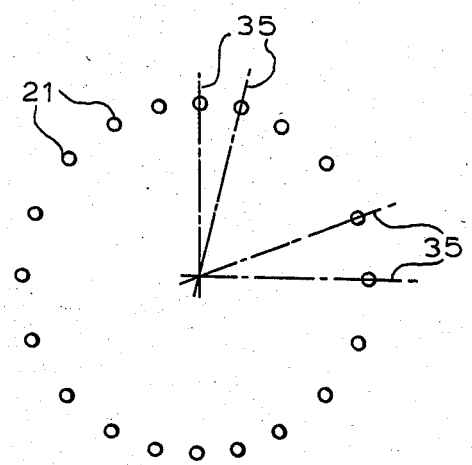
FIG. 4 shows schematically a non-regular distribution of Wiegand wires on the jacket of the pick-cylinder.

The oval gear counter of small width is illustrated in FIGS. 1 through 3. It consists of a counter housing 1 defining a measuring chamber 2 in which two oval gears 3 and 4 rotate on fixed shafts 5 and 6. The open front side 7 of measuring chamber 2 is closed by a housing cover 8 of a non-magnetic material which forms the front end wall of the measuring chamber. The housing cover 8 is formed with a cylindrical well 11 whose axis 13 is in alignment with the axis of rotation of the counting or measuring gear 3. The well 11 extends to such a depth that the partition 15 between the bottom wall 14 of the well and the front end wall 7 of the measuring chamber is relatively thin, considering the strongly enlarged scale of the illustration.

The two bar magnets 9 and 10 are diametrically opposed relative to the shaft 5 and are located in the end portions of the large axis of the oval gear 3. The diameter of a pick-up cylinder 12, as mentioned before, corresponds or exceeds the range of the two bar magnets 9 and 10. The end portion of the pick-up cylinder 12 facing the two magnets 9 and 10 is provided with a circumferential annular groove 17 in which sensing coil 18 is accommodated. Between the end face 14 of the pick-up cylinder 12 and the annular groove 17 is only a thin collar or flange 20 left for supporting the ends of Wiegand wires 21 as it will be explained below. In the cylindrical jacket of pick-up cylinder 12 adjoining the opposite end of the annular groove 17, there are provided axis parallel longitudinal grooves 22 for supporting outer parts of the Wiegand wires 21. The outer end of the pick-up cylinder 12 remote from the measuring gear supports a pole ring 23 of a magnetically conductive material which is inserted on the outer end of the pick-up cylinder and snugly engages the end portions of Wiegand wires 21. The pole ring together with Wiegand wires, sensing coil and the pick-up cylinder form a compact structural unit which is as a one piece insertable into the well 11. After insertion of the pick-up unit into the well, the latter is sealed by a sealing ring 25 and closed by a cover plate 24 which is secured to the housing cover 8 by screws.

The bar magnets 9 and 10 are inserted into the blind bores 26 in the oval gear 3 with opposite polarities and the pole surfaces of these magnets extend to the close proximity of the front end wall 7 of the measuring chamber. The magnets are sealed in the assigned blind bores 26 by stoppers or closing plugs 27.

Referring to FIG. 2, the counter housing 1 is provided with an inlet 28 and an opposite outlet 29 communicating with the measuring chamber 2 midway between the shafts 5 and 6. The measured medium flowing through the measuring chamber in the direction indicated by arrow sets the two oval gears 3 and 4 into rotation about the fixed shafts 5 and 6. The oval gears are provided with bearing bushings 30 and 31 (FIG. 1). Rotary magnetic field produced by magnet 9 is conducted by successive Wiegand wires 21 and closed by the magnetic short-circuit in the pole ring 23 and returned along the opposite Wiegand wires into the other magnet 10. Due to this resulting magnetic loop extending along the Wiegand wires 21 and continuously changing in fast sequence its polarity, strong magnetic pulses are generated in the Wiegand wires which in turn induce strong electric voltage pulses in the sensing coil 18. The coil 18 is connected via connection wire 32 to electrical terminals 33 and to a connection cable 34.

FIG. 3 shows an embodiment where the Wiegand wires 21 are uniformly distributed in the longitudinal grooves 20, 22 on the jacket 16 of the pick-up cylinder 12.

In the case of oval measuring gears where the rotary speed of the magnets is not uniform, a non-uniform distribution of the Wiegand wires 21 on the outer surface of the pick-up cylinder is used so that the non-uniform rotation of the oval gears 3 and 4 is neutralized. The central angle between respective radii 35 passing through the wires varies in synchronism with the variation of the circumferential speed of the oval gear 3 during one revolution, namely twice between a minimum and a maximum value.

It will be understood that each of the elements described above or two more together may also find a useful application in other types of constructions differing from the types described above.

While the invention has been illustrated and described as embodied in a specific example of a pulse counter for use with flow meters of flat design, it is not intended to be limited to the details shown since various modifications and structural changes may be made without departing in any way from the spirit of the present invention.

Without further analysis the foregoing will so fully reveal the gist of the present invention that others can by applying current knowledge, readily adapt it for various applications without omitting features that from the standpoint of prior art fairly constitute essential characteristics of the generic of specific aspects.

What is claimed as new or desired to be protected by Letters Patent is set forth in the appended claims:

1. An electromagnetic pulse pick-up arrangement in a flow meter including a measuring chamber defining an inlet and outlet and a front wall of a magnetically non-conductive material, a measuring gear supported in the measuring chamber for rotation about an axis, the pick-up arrangement comprising a pair of oppositely polarized magnets secured to the measuring gear at opposite locations relative to said axis, a cylindrical well formed in the front wall opposite the measuring gear, a stationary Wiegand sensor including a central pick-up cylinder arranged in the well in an axially spaced relationship with the measuring gear, one end of said pick-up cylinder facing said two magnets, a sensing coil surrounding a portion of the jacket of the pick-up cylinder close to said one end, a plurality of Wiegand wires arranged substantially parallel to each other and extending in axial direction on the jacket of the pick-up cylinder, a portion of each of said Wiegand wires overlapping said sensing coil, and a pole ring of a magnetically conductive material inserted on another portion of the jacket of the pick-up cylinder remote from said one end, and a pole ring engaging another portion of each of said Wiegand wires.

2. A pulse pick-up arrangement as defined in claim 1 wherein the jacket portion of the pick-up cylinder adjacent to said one end is provided with a circumferential annular groove for accommodating the sensing coil, and the outer cylindrical surface of the jacket of the pick-up cylinder being formed with axially directed elongated grooves for accommodating the Wiegand wires.

3. A pulse pick-up arrangement as defined in claim 2 wherein the Wiegand wires are secured in the longitudinal grooves by gluing.

4. A pulse pick-up arrangement as defined in claim 2 wherein the opposite end of said pick-up cylinder is provided with an axial blind bore for temporarily accommodating a holding magnet which holds by its magnetic force the Wiegand wires in the longitudinal grooves until the wires are secured by gluing and the pick-up cylinder is inserted into the well.

5. A pulse pick-up arrangment as defined in claim 2 wherein the longitudinal grooves together with the Wiegand wires extend to the level of the one end face of the pick-up cylinder to contact the bottom surface of the well.

6. A pulse pick-up arrangement as defined in claim 5 wherein the circumferential annular groove for accommodating the sensing coil is separated from the one end of the pick-up cylinder by a thin collar, and the pole ring inserted on the other jacket portion of the pick-up element engaging outer surface of the other portions of the Wiegand wires.

7. A pulse pick-up arrangement as defined in claim 2 wherein said annular groove and said axially directed grooves are filled with a casting material and said Wiegand wires and said sensing coil are embedded in said casting material.

8. A pick-up arrangement as defined in claim 1 wherein each of the two magnets is arranged in a blind bore formed in the side of the measuring gear remote from the front wall and extending to the proximity of the front wall, and each blind bore being sealed by a closing part.

9. A pulse pick-up arrangement as defined in claim 1 comprising an oval measuring gear meshing with another oval gear, the two magnets being rod magnets arranged in the end portions of the long axis of the oval measuring gear, and the axially directed longitudinal grooves on the pick-up cylinder being non-uniformly spaced one from each other to compensate for irregular rotary speed of the oval measuring gear.

* * * * *